April 30, 1963
J. A. McEVOY
3,087,266
SNOW SHOE FOR AUTOMOBILE WHEEL
Filed Nov. 6, 1961
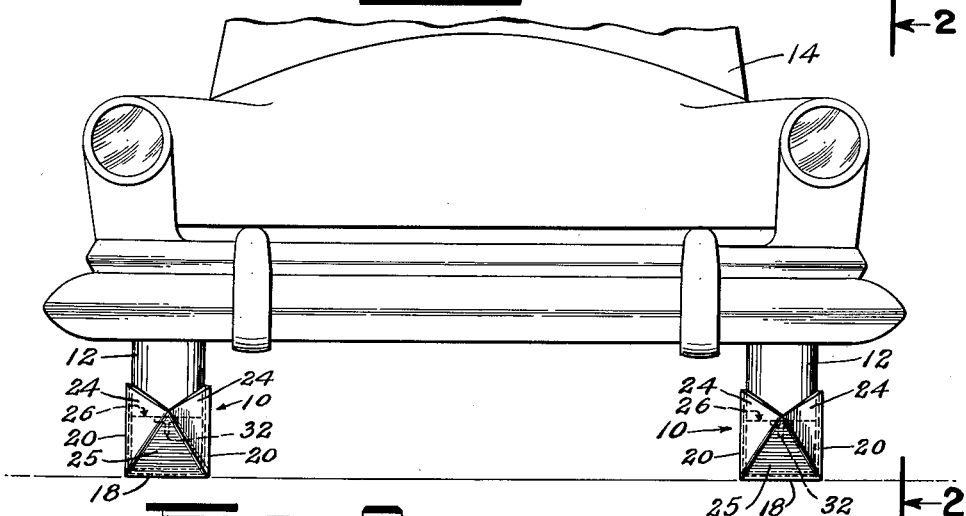
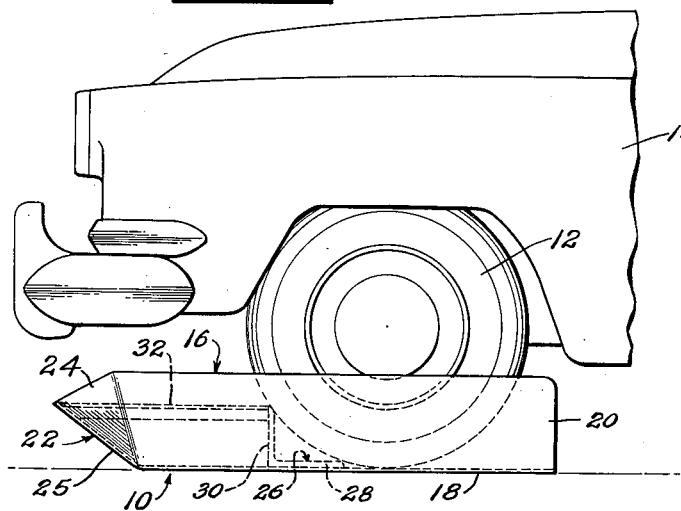
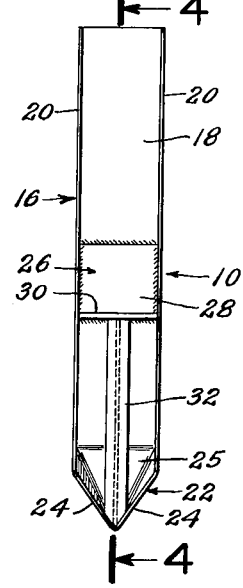
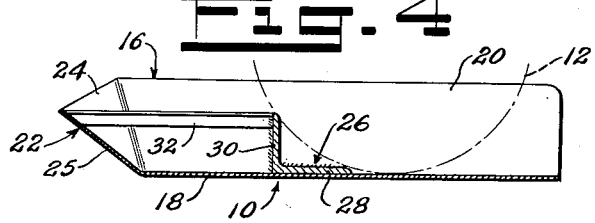
INVENTOR.
JOSEPH A. McEVOY
BY
Edw. S. Higgins
ATTORNEY

United States Patent Office 3,087,266
Patented Apr. 30, 1963

3,087,266
SNOW SHOE FOR AUTOMOBILE WHEEL
Joseph A. McEvoy, 25 Ravine Ave., Yonkers, N.Y.
Filed Nov. 6, 1961, Ser. No. 150,533
1 Claim. (Cl. 37—42)

This invention relates to new and useful improvements in snow removal devices and more particularly to devices adapted to be used in connection with automobiles for removing snow from in front of the wheels of the automobile on city streets and roadways.

A principal object of the present invention is to provide a pair of snow shoes adapted to be mounted on the front wheels of an automobile forwardly of the path of movement of the front wheels of the automobile.

Another object of the invention is to provide a snow shoe for removing snow from in front of the front wheels of an automobile that is easy to mount on the front wheel and easy to take off of the front wheel.

A further object of the invention is to provide a snow shoe for removing snow from in front of the front wheel of an automobile that is simple and rugged in construction and that is practical and efficient in operation.

For further comprehension of the objects and advantages of the invention reference will be had to the following description thereof and to the accompanying drawings and to the appended claims wherein the novel features of the invention are pointed out.

In the accompanying drawing forming a material part of this disclosure:

FIG. 1 is a front elevational view of a fragment of the front of an automobile with a snow shoe embodying my invention applied to each wheel.

FIG. 2 is a side elevational view of the parts shown in FIG. 1 as seen from the line 2—2 of FIG. 1.

FIG. 3 is a top plan view of the improved snow shoe.

FIG. 4 is a vertical sectional view taken on the plane of the line 4—4 of FIG. 3, showing the bottom of a front wheel of an automobile in position in dot-dash lines.

Referring in detail to the drawings, in FIG. 1 a pair of snow shoes 10, 10 embodying my invention is shown applied to the front wheels 12, 12 of an automobile 14. The snow shoes each is formed of suitable metal and each comprises an elongated channel-shaped body 16 opening upwardly as viewed in FIGS. 1 and 2. The body consists of a flat bottom wall 18 and upstanding side walls 20, 20. At one end, the front end as viewed in FIGS. 1 and 2, the body is closed by a closure wall 22 and at its opposite end the body is open. The front closure wall 22 includes two opposed wall portions 24, 24 tapering inwardly toward the center of the wall and a third wall portion 25 tapering upwardly to the center, said wall portions converging to a point at the center of the closure wall. An angle iron 26 is positioned across the space between the side walls 20, 20 at a point remote and rearwardly of the front closure wall 22. One leg 28 of the angle iron is welded to the bottom wall 18 and the side edges of the other upright leg 30 are welded to the side walls, the upright leg extending upwardly to a point slightly above mid-height of the side walls. A T-shaped bracing and reinforcing bar 32 extends from the top of the upright leg 30 of the angle iron to the point of the front closure wall 22, the ends of the bar being welded to the angle iron and closure wall.

In use, a snow shoe 10 is slipped over the bottom periphery of each front wheel 12 of the automobile 14 with the side walls 20, 20 of the shoes embracing the sides of the tires of the wheels and the bottom front periphery of each tire contacting the respective upright leg 30 of the angle iron 26. The upright leg serves as an abutment or stop properly positioning the snow shoe on the wheel. The angle iron together with the T-shaped bar 32 also serves to strengthen and reinforce the snow shoe body preventing buckling thereof when the shoe strikes an obstruction when in use.

The improved snow shoe is particularly designed for use with fresh fallen snow. The snow shoes are effective under these conditions to cut a vertical path in the mass of fallen snow, throwing the snow to sides of the wheels and scraping the street or road, thus eliminating or greatly reducing resistance to the forward movement of the automobile. The upwardly tapered front closure wall gives a runner effect to the snow shoe so that any solid obstruction encountered will not break the snow shoe as the shoe will ride up over said obstruction.

While I have illustrated and described the preferred embodiment of my invention, it will be understood that changes in details of construction might be made without departing from the principle of the invention and I desire therefore to be limited only by the state of the prior art and the appended claim.

I claim:

A snow shoe for an automobile wheel comprising an elongated channel-shaped metal body having bottom and spaced upright side walls, said body opening upwardly and open at one end, the other end of the body having a closure wall, said closure wall having angular side and bottom portions converging toward the center of the closure wall and terminating in a point, an abutment member on the bottom wall extending across to the side walls for positioning the snow shoe on the wheel of an automobile, and an elongated bracing and reinforcing bar T-shaped in cross section extending from the abutment member to the center of the closure wall.

References Cited in the file of this patent
UNITED STATES PATENTS

| | | |
|---|---|---|
| 1,392,166 | Immer | Sept. 27, 1921 |
| 1,694,215 | Golembiewski | Dec. 4, 1928 |
| 1,805,933 | Victor | May 19, 1931 |
| 2,853,307 | Dombrowski | Sept. 23, 1958 |